United States Patent [19]
Moffitt

[11] Patent Number: 6,045,163
[45] Date of Patent: Apr. 4, 2000

[54] PLUMBING ASSEMBLY AND METHOD OF USING THE SAME

[75] Inventor: John M. Moffitt, Wichita, Kans.

[73] Assignee: Case Corporation, Racine, Wis.

[21] Appl. No.: 09/067,560

[22] Filed: Apr. 28, 1998

[51] Int. Cl.[7] .................................................. F16L 41/08
[52] U.S. Cl. .................... 285/139.1; 285/12; 285/139.3; 285/205; 285/305
[58] Field of Search .............................. 285/139.1, 139.2, 285/139.3, 148.22, 205, 206, 213, 305, FOR 143, 14, 12, 357, 906

[56] References Cited

U.S. PATENT DOCUMENTS

| | | | |
|---|---|---|---|
| 3,986,734 | 10/1976 | Davis | 285/305 X |
| 4,057,269 | 11/1977 | Bislew . | |
| 4,650,223 | 3/1987 | Miyazaki et al. | 285/139.1 |
| 4,722,556 | 2/1988 | Todd | 285/12 |
| 5,141,258 | 8/1992 | Stine | 285/148.22 X |
| 5,411,114 | 5/1995 | Bedi et al. | 285/206 X |

*Primary Examiner*—Anthony Knight
*Assistant Examiner*—Karlena D. Schwing
*Attorney, Agent, or Firm*—Mayer, Brown & Platt

[57] ABSTRACT

Plumbing assembly to route plumbing between two chambers such as between two compartments of a piece of machinery or equipment. The plumbing assembly comprises a plumbing component, a plate member through which the plumbing component is routed, and a fastener for securing the plumbing component. The plumbing component has an outer cross-sectional shape, and the plumbing component can have two portions, one portion being angled or curved from the other. Examples of plumbing components that can be used with the plumbing assembly of the invention are pipes, hoses, and tubes for conveying fluids, either liquid or gas. The plate member has a hole defined therethrough to receive the plumbing component. The hole is shaped to engage the outer cross-section of the plumbing component to prevent rotation of the plumbing component within the hole. The fastener prevents axial movement of the plumbing component within the hole.

22 Claims, 2 Drawing Sheets

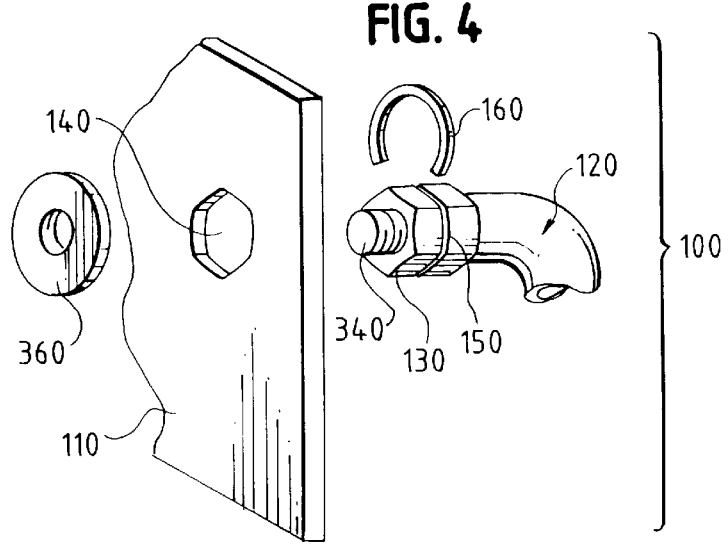
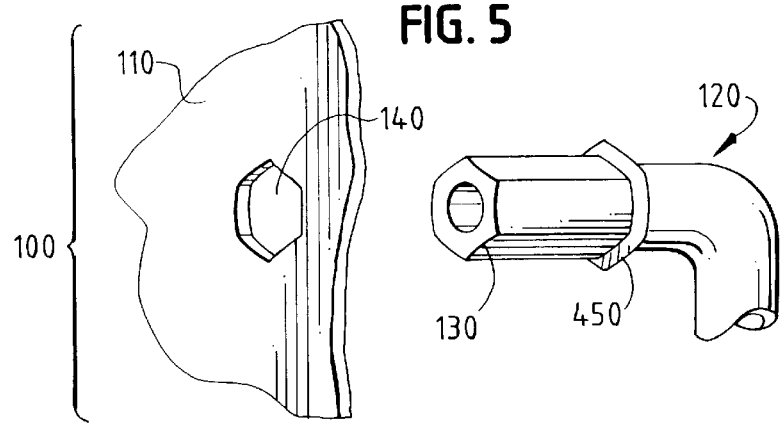
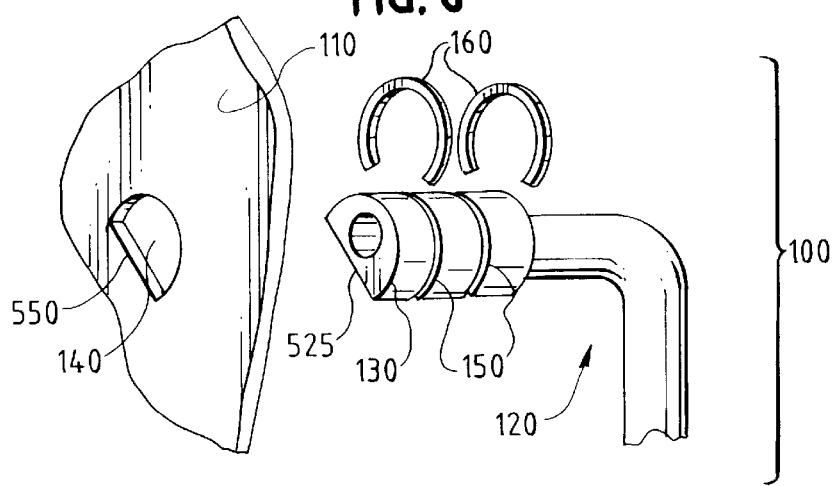

ABSTRACT# PLUMBING ASSEMBLY AND METHOD OF USING THE SAME

BACKGROUND OF THE INVENTION

1. Field of the Invention

The present invention relates to a plumbing assembly and method for routing plumbing between two chambers divided by a plate. Particularly, the present invention is directed to a plumbing assembly and method for securing the plumbing against rotation and axial movement within a hole through the plate.

2. Description of Related Art

Plumbing connections across barriers are commonly necessary in the construction of buildings, the fabrication of machinery, and the assembly of equipment. In order to form a connection between the two sides of the barrier, it is necessary for there to be an opening or aperture in the barrier through which the connection can be made. As such, it is necessary to secure, from both sides of the barrier, the separate pieces of plumbing that are being connected. As a result, the difficulty of creating the plumbing connection is increased and, therefore, the labor, time, and cost of the task are also increased.

Plumbing connections can be necessary for a variety of reasons. The plumbing itself can be any type of sealed conduit including piping, hosing, and tubing capable of containing fluids, either gaseous and liquid. With the fabrication of machinery and assembly of equipment, for example, barriers or partitions may be necessary to isolate particular components. Such components may operate hydraulically or pneumatically and require connection to an appropriate fluid source. Under these circumstances, it will be necessary to route the required plumbing between the chambers defined by the barrier or partition. This is commonly accomplished by providing a connection for the plumbing system proximate the barrier. When such a connection is formed between two plumbing components, it often is desirable to secure the position of the plumbing connection relative to the barrier.

Generally, two installers are required to construct a conventional plumbing connection through a barrier, one installer on each side of the barrier. For example, the installer on a first side of the barrier will position and hold a first plumbing component while the installer on the other side of the barrier will connect a second plumbing component to the first component.

Particularly, the installer on the first side establishes and fixes the position of the first plumbing component with respect to a hole or aperture that is provided in the barrier through which the plumbing will be connected. The installer on the second side can then make the connection between the two plumbing components. Without two installers, it is difficult or impossible to construct such a connection.

In certain situations, however, it may not be possible to have two installers. As a result, it often is necessary to form a second hole through the barrier to allow access to both sides of the barrier. This second hole must be large enough to accommodate the installer's hand or appropriate installation tool. When formed in equipment or machinery, however, this second hole becomes an open path for noise and particulates. The second hole therefore must then be sealed after the plumbing connection is formed, or remain open and thus eliminate the advantages of the barrier.

For the reasons discussed above, it is evident that conventional plumbing connections between two chambers defined by a barrier result in increased labor costs and, therefore, increased construction, fabrication, or manufacturing costs. As such, there remains a need for a more efficient assembly that permits the installation of a secure plumbing connection between two chambers defined by a barrier.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus and method particularly pointed out in the appended claims.

The present invention is directed to a plumbing assembly for routing plumbing between two chambers. A chamber is understood to be any area, either opened or closed, that is defined by and separated from another area by a barrier such as a wall, plate or partition. The assembly of the invention can be used to route various types of plumbing including, but not limited to, piping, hosing, and tubing for conveying fluids, either gaseous or liquid.

The plumbing assembly of the present invention is generally comprised of a plumbing component having an outer cross-section, a plate member through which the plumbing is routed, and a fastener. An exemplary plumbing component is a hose stem. The term "outer cross section" is understood to define generally the outer surface shape or configuration of the plumbing component as viewed in cross-section. The plate member has a hole or aperture defined therethrough for receiving the plumbing component. The hole is shaped to engage the outer cross-section of the plumbing component, thereby preventing rotation of the plumbing component within the hole. The fastener, which may include a weld, joint or a coupling, is applied to prevent axial movement of the plumbing component within the hole.

In a preferred embodiment of the plumbing assembly of the invention, the plumbing component has one or more receiving grooves formed in an outer surface thereof. The fastener includes one or more clips that can be received by or inserted into the receiving grooves of the plumbing component. When the clip is inserted into the receiving groove, axial movement of the plumbing component within the hole is restricted. If the plumbing component has two receiving grooves, they may be spaced such that when the plumbing component is positioned within the hole, the receiving grooves are on opposite sides of the plate member. In such an embodiment, the receiving grooves are spaced apart by a distance at least equivalent to the thickness or depth of the plate member proximate the hole. With two receiving grooves, the fastener includes a clip to be received by each groove to prevent axial movement in either direction.

The plumbing assembly can further include one or more shims positioned between the clips and the plate member. Like the combination of the receiving groove and clip, shims restrict axial movement of the plumbing component within the hole. Although the shims can be fabricated of any suitable material, an elastomeric material or similar vibration-dampening material is preferred.

Alternatively, the fastener of the plumbing assembly can secure the plumbing component axially in the hole by including a weld, a threaded member, or an outwardly extending flange. Axial stability can be achieved by forming a weld between the plumbing component and the plate member. Welding material is selected depending on the application of the plumbing assembly. The fastener can also include one or more threaded members to engage one or more threaded portions of the plumbing component. In another embodiment, the fastener includes a flange extending radially from the outer cross-section of the plumbing component to locate the plumbing component within the hole. The fastener is not limited to a weld, threaded member, or extending flange for securing the plumbing component.

Another aspect of the plumbing assembly of the invention, in addition to restricting axial movement, is to restrict or prevent rotation of the plumbing component within the hole. The hole is shaped to engage the outer cross-section of the plumbing component so as to prevent such rotation. Preferably, the hole and the outer cross-section of the plumbing component are substantially identical in shape. For example, and in a preferred embodiment of the plumbing assembly of the invention, the outer cross-section of the plumbing component has one or more planar sides and the hole has one or more corresponding straight edges. Even more preferably, the outer cross-section has a polygonal shape (e.g. rectangular, pentagonal, hexagonal, octagonal, etc.) and the hole has a matching polygonal shape.

Depending on the desired application of the plumbing assembly of the invention, the plumbing component of the plumbing assembly may have any of a variety of configurations. For example, the plumbing component may be a linear member such that when aligned with the hole through the plate member, it is perpendicular to the plate member. In another embodiment, the plumbing component may have a first portion that is to be inserted into the hole of the plate member and a second portion angled relative to the first portion. The plumbing assembly of the invention therefore can be used for a plumbing configuration in which a portion of the plumbing component is to be angled upward or downward away from the hole through the plate member. Additionally, the plate member can be configured to hold the second portion of the plumbing component at a predefined angle relative to a vertical plane passing through the hole.

The plumbing assembly of the invention can further comprise a sleeve insert that surrounds the outer cross-section of the plumbing component while the plumbing component is within the hole. The sleeve insert can be fabricated of any suitable material including an elastomeric material. The benefits of utilizing a sleeve insert include, but are not limited to, noise and vibration reduction and protection of the exterior surface of the plumbing component. Use of a shim between the plate member and a clip also has the benefit of reducing noise and vibration between the plate member and the plumbing component.

The objects and advantages of the present invention are further achieved by a method of routing plumbing through a plate member. The method of the invention comprises the steps of providing a plumbing component, defining a hole through the plate member, inserting the plumbing component into the hole so as to extend through the plate member, and securing the plumbing component axially within the hole. The hole through the plate member is shaped to engage the outer cross-section of the plumbing component to prevent rotation of the plumbing component within the hole.

The securing step may include applying at least one clip within a receiving groove that is formed in the plumbing component. The clip prevents axial movement of the plumbing component through the hole. In this embodiment where the securing step includes applying at least one clip, the method can further include the step of positioning one or more shims between at least one of the clips and the plate member proximate the hole. Therefore, the shim is also positioned between the receiving groove formed in the plumbing component and the plate member.

Further with respect to the method of routing the plumbing of the invention, the outer cross-section of the plumbing component can be provided with one or more planar sides. When the outer cross-section has a planar side, the hole defined through the plate member has a corresponding straight edge which engages the planar side of the outer cross-section, thereby preventing rotation of the plumbing component within the hole.

In another embodiment of the method of the invention, the plumbing component has a first portion that is inserted into the hole defined through the plate member. The plumbing component also has a second portion angled relative to the first portion. When the first portion is inserted into the hole, the second portion is aligned at a predefined angle relative to the vertical plane passing through the hole. The method of the invention can further comprise the step of surrounding the outer cross-section of the plumbing component with a sleeve such that the sleeve and the plumbing component are both received within the hole through the plate member. The sleeve prevents rotation and axial movement of the plumbing component within the hole and can provide the additional benefit of dampening noise between the two sides of the plate member.

The plumbing assembly and method of routing plumbing of the invention provide several advantages over the prior art. For example, the present invention eliminates the need for two persons to install a plumbing connection between opposite sides of walls, partitions, and other types of plate members. The present invention also permits the plumbing connection installed by a single person to be secure and to be fixed against rotation and axial movement within the hole through the plate member.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

FIG. 4 is an exploded perspective view of another embodiment of the plumbing assembly of the invention.

FIG. 5 is an exploded perspective view of another embodiment of the plumbing assembly of the invention.

FIG. 6 is an exploded perspective view of another embodiment of the plumbing assembly of the invention.

DETAILED DESCRIPTION OF THE PREFERRED EMBODIMENT

Figure 1:
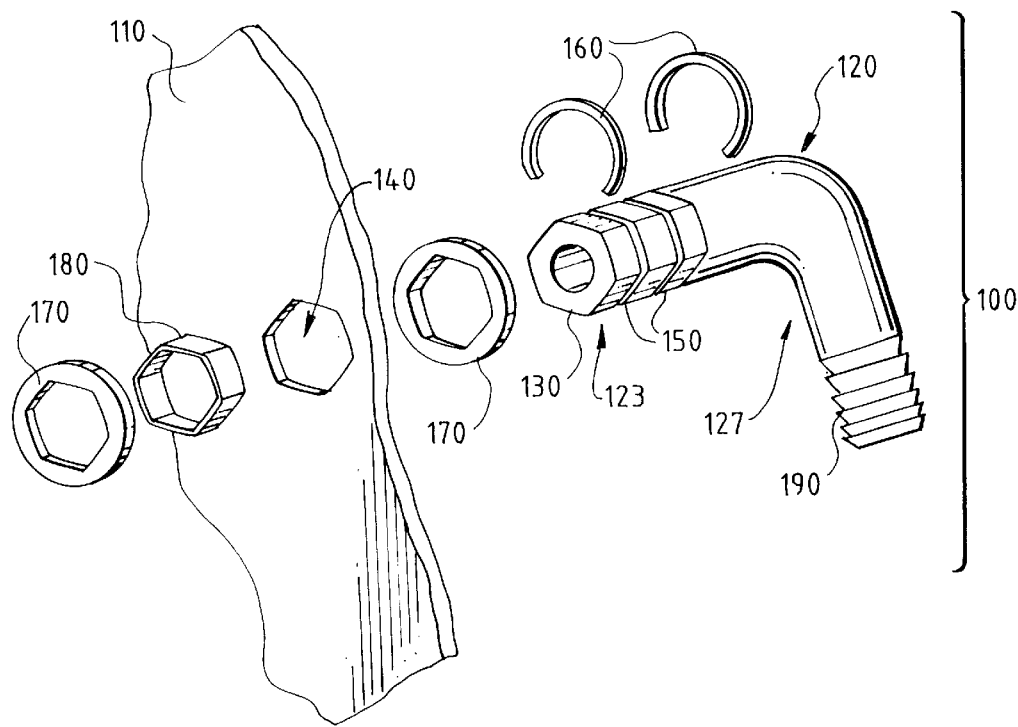
FIG. 1 is an exploded perspective view of an embodiment of the plumbing assembly of the present invention.

Reference will now be made in detail to the present preferred embodiment of the plumbing assembly of the invention, examples of which are illustrated in the accompanying drawings. Wherever possible, the same reference characters will be used throughout the drawings to refer to the same or like parts. The method of the present invention will be described in conjunction with the detailed description of the plumbing assembly for clarity.

An exemplary embodiment of the plumbing assembly of the present invention is shown in FIG. 1 and designated generally by reference character 100. One use of the plumbing assembly of the invention is for routing plumbing between two chambers. The plumbing assembly may be used with either hydraulic or pneumatic plumbing systems and may also be used in conduit fashion wherein the plumbing carries wire, optical fiber, etc. The chambers between which the plumbing must be routed are broadly understood to be any two areas or spaces, either opened or closed, that are divided by a plate or similar barrier structure. Examples of chambers for which the present invention may be useful include, but are not limited to, the area on the exterior side of a wall and the area on the enclosed side of the wall, compartments within a piece of machinery, compartments within the body of a vehicle, including passenger and heavy equipment-type vehicles, and spaces defined within large pieces of equipment.

The plumbing assembly 100 of the invention is comprised of a plumbing component 120, a plate member 110 through which the plumbing component 120 is routed, and a fastener 160. The plumbing component 120 may be a segment of either a hydraulic or pneumatic plumbing system, which may be comprised of pipes, hoses or tubes capable of conveying a liquid or gaseous fluid. The plumbing component 120 is the segment or branch of the plumbing system that will be the point of connection through the plate member 110 separating the two chambers. Examples of types of plumbing components 120 include, but are not limited to, pipes, rigid-walled tubes or joint connectors for hoses. Each end of the plumbing component 120 preferably has a connection portion 190 to which the remainder of the plumbing system can be connected. For example, such connection portions 190 may include a threaded coupling, a weld compatible surface or a JIC configuration for engagement of a hose. Alternatively, no connection portion 190 need be provided as part of the plumbing component 120 if not necessary or desired. For example, the plumbing component 120 described herein is a hose stem having a JIC hose connection portion 190 at one end. The plumbing component 120 is made of a substantially rigid material, such as a metal or a plastic. The plumbing component 120 has an outer cross-section 130 defined where the connection through the plate member 110 will be made. The outer cross-section 130 is generally the outer surface shape or configuration of the plumbing component 120 as viewed in cross-section. Although not limited in its shape, the outer cross-section 130 is configured to engage a hole 140 provided through the plate member 110 so as to prevent rotation of the plumbing component 120 within the hole 140 as described further below.

The plate member 110 is any conventional barrier structure, or a portion thereof, that is used for dividing two chambers or spaces. The plate member 110 therefore may include a planar member or wall or a structural component such as the web of an "I" beam or the like. As previously noted, the plate member 110 has a hole 140 defined therethrough to receive the plumbing component 120. The hole 140 designates the location at which the connection will be made between two ends or segments of the plumbing system. In other words, the location of the hole 140 defines the area of the plate member 110 through which the plumbing must be routed. The hole 140 is shaped to receive the plumbing component 120 and to engage the outer cross-section 130 thereof. By providing an appropriate shape or configuration for the outer cross-section 130, and in accordance with the invention, the hole 140 thereby prevents rotation of the plumbing component 120 within the hole 140. The restriction of rotational motion of the plumbing component 120 within the hole 140 simplifies the routing of the plumbing and assists a one-person connection to the other end or segment of the plumbing system.

In order for the hole 140 to prevent rotational movement of the plumbing component 120, the outer cross-section 130 must have certain characteristics. Correspondingly, the hole 140 shaped to receive the outer cross-section 130 must accommodate those characteristics. For example, as shown in FIG. 6, the outer cross-section 130 has one planar side and the hole 140 has a corresponding straight edge to define the engaging location that will prohibit rotation about the longitudinal axis of the plumbing component 120. Preferably, and as shown in FIG. 1, the outer cross-section 130 is polygonal with equal sides to allow selective orientation of the plumbing component 120 in the hole 140. When the shape of the outer cross-section 130 is irregular, it will define only one allowed orientation in the hole 140. This is useful when the plumbing component 120 has an angled second portion that is to be oriented at a predetermined angle.

While the engagement of the outer cross-section 130 of the plumbing component 120 in the hole 140 defined through the plate member 110 prevents rotational movement, a fastener is provided in accordance with the invention to prevent axial movement of the plumbing component 120 in the hole 140. In one embodiment of the present invention, the plumbing component 120 has one or more receiving grooves 150 formed in the exterior surface of the outer cross-section 130. Further in this embodiment, the fastener includes a clip 160 that is to be inserted into each receiving groove 150. With the plumbing component 120 properly inserted into the hole 140, the positioning of the clip 160 within the receiving groove 150 prevents axial movement of the plumbing component 120 in the hole 140. That is, the outer dimension of the clip 160 is sufficient to extend radially outward when the clip 160 is inserted into the receiving groove 150 so as to define a stop member to prevent axial movement of the plumbing component 120. Preferably, the plumbing component 120 includes two grooves 150 spaced apart by a distance at least equivalent to the thickness of the plate member 110 proximate the hole 140. With this aspect, the fastener includes a clip 160 to be received by each groove 150 (positioned on each side of the plate member 110 when the plumbing component 120 is inserted therethrough) to prevent axial movement in either direction of the plumbing component 120 in the hole 140. The depth of each receiving groove 150 can vary depending on the application of the plumbing assembly 100, although the depth must be sufficient to receive a corresponding clip 160. Each clip 160 is preferably made of a substantially rigid material such as a metal or a plastic.

Figure 2:
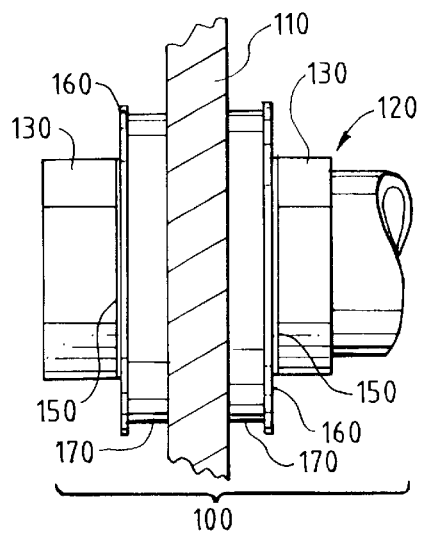
FIG. 2 is side view of the plumbing assembly shown in FIG. 1.

In another aspect of the embodiment in which the fastener includes one or more clips 160, one or more shims 170 may be provided between the plate member 110 and the clip 160. Hence, and as best shown in FIG. 2, one shim 170 is located on either side of the plate member 110 once the outer cross-section 130 is engaged within the hole 140. The shims 170 further reduce the axial movement of the plumbing component 120 within the hole 140. Particularly, the shims 170 allow a plumbing component 120 having receiving grooves 150 spaced a fixed distance apart to be used in conjunction with plate members 110 of various thicknesses. When a plate member 110 having a thickness less than the spacing between the grooves 150 of the plumbing component 120 is used, shims 170 of appropriate thickness will accommodate the remaining gap to provide a snug fit in the axial direction.

Shims 170 of a variety of different shapes may be used, as long as the desired thickness is provided. For example, a shim 170 having a circular washer or O-ring configuration may be used even though the outer cross-section 130 of the plumbing component 120 is polygonal. The inner diameter of the shim 170 therefore is sufficiently large to accommodate the outer cross-section 130 of the plumbing component 120, yet does not exceed the outer dimensions of the clip 160. The shims 170 can be fabricated of any suitable material, although an elastomeric or similar vibration dampening material is preferred. The shims 170 thereby can also provide additional benefits including dampening of vibration and noise across the plate member 110 and the piping component 120. When the shim 170 is fabricated of a material having elasticity, extension of the shim 170 over the outer cross-section 130 is facilitated.

In accordance with another aspect of the plumbing assembly 100 of the invention, the plumbing assembly 100 includes a sleeve insert 180 (see FIG. 1). The sleeve 180 surrounds the outer cross-section 130 of the plumbing component 120 when the plumbing component 120 is received within the hole 140. The sleeve 180 may be fabricated of any suitable material, although an elastomeric material is preferred. The sleeve 180 may be formed as a separate member or may be applied as an overmolding or coat on the surface of the plumbing component 120. As with the shim 170, when the sleeve 180 is made of a material having some elasticity, it is easier to fit the sleeve 180 around the outer cross-section 130 of the plumbing component 120. In this manner and in addition to reducing rotational and axial movement of the plumbing component 120 within the hole 140 by providing a friction fit, the sleeve 180 provides additional benefits including reduced vibration and noise between the chambers separated by the plate member 110.

When the plumbing assembly 100 comprises components such as shims 170 or a sleeve 180, routing of the plumbing component 120 and creation of a plumbing connection on the opposite side of a plate member 110 is simplified. By further reducing the rotational and axial movement of the plumbing component 120 within the hole 140, the shims 170 and sleeve 180 facilitate the routing to be completed by one person on the receiving side of the plate member 110 rather than by two persons on opposite sides of the plate member 110. In addition to one-person installation, the plumbing connection made is more secure and is less likely to be subject to disruption.

In some applications, it may be desirable or necessary to create a predetermined orientation of the plumbing component 120 in relation to the plate member 110. For such applications, the plumbing component 120 has a first portion 123 that is inserted into the hole 140 defined through the plate member 110 and a second portion 127 that is angled relative to the first portion 123. This angled configuration may be formed either as a gradual curve or a more abrupt angle, and may define any degree of angle desired including, by way of example only, a 90° right angle. Furthermore, and because the outer cross-section 130 of the plumbing component 120 and the hole 140 are configured to engage each other so as to prevent rotation in accordance with the invention, the hole 140 defined through the plate member 110 is configured to hold the plumbing component 120 in such a way that the second portion 127 is aligned at a predefined angle relative to a vertical plane passing through the hole 140. This angled configuration of the second portion 127 therefore may accommodate a particular purpose or arrangement of the plumbing system being routed through the plate member 110. Angling of a portion of the plumbing component 120 can also provide benefits including, but not limited to, reducing the space needed for the plumbing system and increasing the number of directions from which the plumbing component 120 can approach the hole 140 defined through the plate member 110.

In FIG. 2, the components of the plumbing assembly 100 that were shown in exploded view in FIG. 1 are shown assembled. FIG. 2 is a side view through the plate member 110 depicting how the plumbing assembly 100 appears after the outer cross-section 130 of the plumbing component 120 is engaged within the hole defined through the plate member 110. The outer cross-section 130 defines generally the outer surface shape or configuration of the plumbing component 120 as viewed in cross-section. The similarity in shape of the hole 140 to the outer cross-section 130 prevents rotation of the plumbing component 120 within the hole 140. In the embodiment of the plumbing assembly 100 depicted in FIG. 2, the fastener includes clips 160 received within grooves 150 formed in the outer cross-section 130 of the plumbing component 120. The grooves 150 are spaced apart by a distance greater than the thickness of the plate member 110 proximate the hole 140. When the clips 160 are received by the grooves 150, axial movement of the plumbing component 120 within the hole 140 is prevented. A shim 170 is provided between the plate member 110 and the clip 160 on each side of the plate member 110. The shims 170 further reduce axial movement of the plumbing component 120 within the hole 140. The shims 170 may also reduce vibration of the plumbing component 120 and dampen noise between sides of the plate member 110. The plumbing assembly 100 maintains the position of the plumbing component 120 in such a way that a secure connection can be made by one person.

Figure 3:
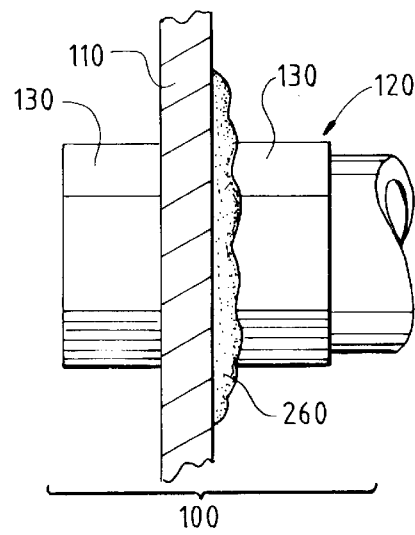
FIG. 3 is a side view of another embodiment of the plumbing assembly of the invention.

FIG. 3 depicts a side view of an alternative embodiment of the plumbing assembly 100 through the thickness of the plate member 110. In this embodiment, the plumbing component 120 has been routed through the hole defined in the plate member 110 such that the outer cross-section 130 is engaged by the hole to prevent rotation of the plumbing component 120. The fastener of the plumbing assembly 100 includes a weld 260 between the plumbing component 120 and the plate member 110. The weld 260 prevents axial and rotational movement of the plumbing component 120 within the hole. Though depicted on one side of the plate member 110 in FIG. 3, alternatively or additionally, the weld 260 can be formed on the other side of the plate member 110 to fasten the plumbing component 120.

FIG. 4 depicts another embodiment of the fastener of the plumbing assembly 100. In FIG. 4, the fastener includes one or more threaded elements, 340 and 360, to engage a portion of the plumbing component 120 within the hole 140 defined through the plate member 110. The fastener is comprised of a threaded portion 340 formed at the distal end of the plumbing component 120 and a matching threaded member or coupling 360 provided to engage the threaded portion 340. When the outer cross-section 130 is engaged within the hole 140 so as to prevent rotational movement, the threaded elements, 340 and 360, engage each other to secure the plumbing component 120 with respect to axial movement in the direction of the component 120. Preferably, a flange or receiving groove and clip configuration is provided on the opposite side of the plate member 110 to prevent axial movement in the direction of the coupling 360.

The plumbing assembly 100 of the invention encompasses a variety of fasteners capable of reducing or preventing axial movement of the plumbing component 120 within the hole 140. Another embodiment of a fastener that prevents axial movement is depicted in FIG. 5, which is an exploded view of an embodiment of the plumbing assembly 100. In this embodiment, the fastener includes an integral flange 450 extending radially outward from the outer cross-section 130 of the plumbing component 120 to locate the plumbing component 120 axially within the hole 140. Once the outer cross-section 130 is engaged within the hole 140, the plumbing component 120 is inserted until the flange 450 abuts against the plate member 110, either directly or with a shim 170 or similar spacer member therebetween. The flange 450 acts like a stopper in preventing axial movement. The shape of the flange 450 may be substantially similar to that of the of the outer cross-section 130 if desired, or be provided with a different shape, so long as the selected shape abuts against the plate member 110 and does not pass through the hole 140.

As previously stated, the purpose of the hole 140 being shaped to engage the outer cross-section 130 is to prevent rotation of the plumbing component 120 within the hole 140. In order to engage the outer cross-section 130, the hole 140 defined through the plate member 110 preferably is substantially identical in shape to the outer cross-section 130 so that rotational movement of the plumbing component 120 within the hole 140 is significantly prevented. To prevent rotation, the outer cross-section 130 has certain characteristics. For example, the outer cross-section 130 may have at least one planar side and, therefore, the hole 140 must have a corresponding straight edge to define the engaging location that will prohibit rotation about the longitudinal axis of the plumbing component 120. There are other concave and convex shapes that the outer cross-section 130 and hole 140 may have that will prevent rotation. Preferably, both the hole 140 and the outer cross-section 130 each have a matching polygonal shape including, but not limited to, rectangular, pentagonal, hexagonal, septagonal or octagonal. Polygonal shapes permit multiple orientations of the plumbing component 120 in the hole 140.

An embodiment of the plumbing assembly 100 depicting the outer cross-section 130 having at least one planar side 525 is shown in FIG. 6. The outer cross-section 130 of the plumbing component 120 has one planar side 525 and the hole 140 has a corresponding straight edge 550. This irregular shape defines only one allowed orientation of the outer cross-section 130 in the hole 140. It is also possible for the outer cross-section 130 to have more than one planar side 525 and for the hole 140 to have more than one corresponding straight edge 550. The engagement of the planar side 525 by the straight edge 550 prevents rotational movement of the plumbing component 120 within the hole 140. Regardless of the shape of the outer cross-section 130, the outer cross-section 130 can still have grooves 150 formed into it for receiving clips 160. While the engagement between the planar side 525 and the straight edge 550 will prevent rotational movement, inserting the clips 160 into the grooves 150 will prevent axial movement of the plumbing component 120 in the hole 140. The grooves 150 are spaced apart by a distance at least as great as the thickness of the plate member 110 in the proximity of the hole 140. This permits insertion of a clip 160 into a groove 150 on either side of the plate member 110 when the outer cross-section 130 is engaged within the hole 140.

The present invention is also directed to a method of routing plumbing through a plate member 110. With reference to the plumbing assembly 100 described above, the method of the invention generally includes the steps of providing a plumbing component 120, defining a hole 140 through the plate member 110, inserting the plumbing component 120 into the hole 140 so as to extend through the plate member 110, and securing the plumbing component 120 axially within the hole 140. The plumbing component 120 has an outer cross-section 130 as previously defined. The hole 140 defined through the plate member 110 is shaped to engage the outer cross-section 130 of the plumbing component 120 to prevent rotation of the plumbing component 120 within the hole 140. The outer cross-section 130 of the plumbing component 120 may be provided with one or more planar sides 525 as described above. Additionally, the hole 140 may be defined with a corresponding straight edge 550 to engage the planar side 525 and prevent rotation of the plumbing component 120.

Further in accordance with one embodiment of the invention, the securing step may include applying a clip 160 within a receiving groove 150 formed into the plumbing component 120. When the clip 160 is inserted into the receiving groove 150, axial movement of the plumbing component 120 through the hole 140 is prevented. In order to best restrict axial movement, the receiving groove 150 is formed into the outer cross-section 130. This permits insertion of the clip 160 in close proximity to the hole 140. This embodiment of the method, which includes applying the clip 160, can further include a step of positioning one or more shims 170 between the clip 160 and the plate member 110 proximate the hole 140. In addition to further reducing axial movement, the shims 170 can provide benefits including reduced vibration and dampened noise between the two chambers divided by the plate member 110. Shims 170 can be positioned on either or both sides of the plate member 110. Alternatively, the securing step may include providing a weld, a threaded coupling or outwardly directed flange as previously described above.

Depending on the application of the method, it may also be desirable for the plumbing component 120 to be provided with a first portion 123 that is inserted into the hole 140 and a second portion 127 angled relative to the first portion 123. The second portion 127 may be a curved portion in relation to the first portion 123 to form the angled configuration. The hole 140 is defined to hold the plumbing component 120 with the second portion 127 aligned at a predefined angle relative to a vertical plane passing through the hole 140.

In order to further reduce rotational and axial movement, the method of the invention can also comprise a step of surrounding the outer cross-section 130 of the plumbing component 120 with a sleeve 180. The sleeve 180 is received with the plumbing component 120 within the hole 140. In addition to reducing movement, the sleeve 180 may also provide benefits such as reducing vibration and dampening noise between the two sides of the plate member 110.

In view of the description above, it is evident that the plumbing assembly 100 and method of routing plumbing of the present invention provide several advantages over the assemblies and methods currently available. The plumbing assembly 100 of the invention permits plumbing to be routed through a plate member 110 more readily and efficiently.

Although reference has been made to the use of the present invention for routing plumbing for the purpose of explanation, it is understood that alternative applications for the plumbing assembly may be possible. It also will be apparent to those skilled in the art that various modifications and variations can be made in the design and construction of the plumbing assembly, as well as in the performance of the method, without departing from the scope or spirit of the invention.

Other embodiments of the invention will be apparent to those skilled in the art from consideration of the specification and practice of the invention disclosed herein. It is intended that the specification and examples of embodiments be considered as exemplary only, with the true scope and spirit of the invention being indicated by the following claims.

What is claimed is:

1. A plumbing assembly comprising:
   a plumbing component having an outer cross-section;
   a plate member through which the plumbing component is routed, the plate member forming a permanent barrier between two chamber, wherein at least one of said chambers is an enclosed compartment separated from the other chamber by said plate member, and the plate member having a hole defined therethrough, the hole being shaped to engage the outer cross-section of the plumbing component to prevent rotation of the plumbing component within the hole; and
   at least one fastener engagable on the outer cross-section.

2. The plumbing assembly of claim 1 wherein the plumbing component has at least one receiving groove formed therein, the fastener including a clip to be received within the groove.

3. The plumbing assembly of claim 1 wherein the fastener includes a weld attaching said plumbing component and the plate member.

4. The plumbing assembly of claim 1 wherein the fastener includes at least one threaded element to engage a threaded portion of said outer cross-section of said plumbing component.

5. The plumbing assembly of claim 1 wherein the fastener includes a flange extending radially from the outer cross-section of the plumbing component to locate the plumbing component within the hole.

6. The plumbing assembly of claim 1 wherein the hole defined through the plate member and the outer cross-section of the plumbing component are substantially identical in shape.

7. The plumbing assembly of claim 1 wherein the outer cross-section of the plumbing component has at least one planar side and the hole has a corresponding straight edge.

8. The plumbing assembly of claim 7 wherein the outer cross-section of the plumbing component is polygonal in shape.

9. The plumbing assembly of claim 1 wherein the plumbing component has a first portion to be inserted into the hole of the plate member and a second portion angled relative to the first portion.

10. The plumbing assembly of claim 9 wherein the hole in the plate member is configured to hold the plumbing component with the second portion aligned at a predefined angle relative to a vertical plane passing through the hole.

11. The plumbing assembly of claim 1 further comprising a sleeve insert to surround the outer cross-section of the plumbing component when received within the hole.

12. The plumbing assembly of claim 11 wherein the sleeve insert is fabricated of an elastomeric material.

13. The plumbing assembly of claim 1 wherein the plumbing component is a hose stem.

14. A plumbing assembly comprising:
   a plumbing component having an outer cross-section;
   a plate member through which the plumbing component is routed, the plate member having a hole defined therethrough, the hole being shaped to engage the outer cross-section of the plumbing component to prevent rotation of the plumbing component within the hole; and
   at least one fastener engagable on the outer cross-section;
   wherein the plumbing component has at least one receiving groove formed therein, the fastener including a clip to be received within said groove; and
   wherein at least one shim is provided between the plate member and the clip.

15. The plumbing assembly of claim 14 wherein the shim is fabricated of an elastomeric material.

16. A plumbing assembly comprising:
   a plumbing component having an outer cross-section,
   a plate member through which the plumbing component is routed, the plate member having a hole defined therethrough, the hole being shaped to engage the outer cross-section of the plumbing component to prevent rotation of the plumbing component within the hole;
   at least one fastener engagable on the outer cross-section; and
   wherein the plumbing component includes two grooves spaced apart by a distance at least equivalent to a thickness of the plate member proximate the hole, the fastener including a clip to be received by each groove to prevent axial movement of the plumbing component in the hole.

17. A method of routing plumbing between two chambers, the method comprising the steps of:
   providing a plumbing component having an outer cross-section;
   providing a plate member between the two chambers, wherein the plate member is a permanent barrier between the two chambers and wherein at least one of said chambers is an enclosed compartment separated from the other chamber by said plate member;
   defining a hole through the plate member between the two chambers, the hole being shaped to engage the outer cross section of the plumbing component to prevent rotation of the plumbing component within the hole;
   inserting the plumbing component into the hole so as to extend through the plate member; and
   securing the plumbing component axially within the hole.

18. The method of routing plumbing of claim 17 wherein the securing step includes applying a clip within a receiving groove formed into the plumbing component, the clip preventing axial movement of the plumbing component through the hole.

19. The method of routing plumbing of claim 17 wherein the outer cross-section of the plumbing component is provided with at least one planar side and the hole is defined with a corresponding straight edge to engage the planar side and prevent rotation of the plumbing component.

20. The method of routing plumbing of claim 17 wherein the plumbing component is provided with a first portion to be inserted into the hole and a second portion angled relative to the first portion, and the hole is defined to hold the plumbing component with the second portion aligned at a predefined angle relative to a vertical plane passing through the hole.

21. The method of routing plumbing of claim 17 further comprising the step of surrounding the outer cross-section of the plumbing component with a sleeve, prior to inserting the plumbing component into the hole so that the sleeve and the plumbing component are received within the hole.

22. A method of routing plumbing between two chambers, the method comprising the steps of:

provviding a plate member between the two chambers;

defining a hole through the plate member between the two chambers, the hole being shaped to engage the outer cross-section of the plumbing component to prevent rotation of the plumbing component within the hole;

inserting the plumbing component into the hole so as to extend through the plate member;

securing the plumbing component axially within the hole;

wherein the securing step includes applying a clip within a receiving groove formed into the plumbing component, the clip preventing axial movement of the plumbing component through the hole; and positioning at least one shim between the receiving groove and the plate member proximate the hole prior to inserting the plumbing component into the hole.

* * * * *